(12) United States Patent
Casino

(10) Patent No.: US 9,650,097 B2
(45) Date of Patent: May 16, 2017

(54) BICYCLE WIND RESISTANCE TRAINER

(71) Applicant: Andrew Casino, Floral Park, NY (US)

(72) Inventor: Andrew Casino, Floral Park, NY (US)

(*) Notice: Subject to any disclaimer, the term of this patent is extended or adjusted under 35 U.S.C. 154(b) by 151 days.

(21) Appl. No.: 14/259,765

(22) Filed: Apr. 23, 2014

(65) Prior Publication Data
US 2014/0312602 A1 Oct. 23, 2014

Related U.S. Application Data

(60) Provisional application No. 61/815,032, filed on Apr. 23, 2013.

(51) Int. Cl.
A63B 69/00 (2006.01)
B62J 17/00 (2006.01)
B62J 99/00 (2009.01)

(52) U.S. Cl.
CPC .............. B62J 17/00 (2013.01); A63B 69/00 (2013.01); B62J 99/00 (2013.01); B62J 2099/0086 (2013.01)

(58) Field of Classification Search
CPC ........ B64D 17/24; B64D 17/28; B64D 19/00; A63H 33/20; A63H 27/087; A63B 69/16; A63B 69/0028
USPC .......................................................... 135/29
See application file for complete search history.

(56) References Cited

U.S. PATENT DOCUMENTS

| | | | | |
|---|---|---|---|---|
| 1,800,119 A | * | 4/1931 | Tuthill | 135/25.31 |
| 1,911,784 A | * | 5/1933 | Adler | 135/25.31 |
| 3,380,756 A | * | 4/1968 | Poynter | 280/288.4 |
| 3,545,790 A | * | 12/1970 | Davis et al. | 280/288.4 |
| 3,614,132 A | * | 10/1971 | Ashworth | 280/288.4 |
| 3,993,323 A | * | 11/1976 | Lussier | 280/288.4 |
| 4,190,218 A | * | 2/1980 | Cousens, Jr. | 244/155 R |
| 5,217,186 A | * | 6/1993 | Stewart et al. | 244/142 |
| 5,460,589 A | * | 10/1995 | Dunn | 482/111 |
| 5,472,394 A | * | 12/1995 | Michaelson | 482/74 |
| 8,240,610 B1 | * | 8/2012 | Cooper | 244/143 |
| 8,371,993 B2 | * | 2/2013 | Brown et al. | 482/74 |
| 2008/0161167 A1 | * | 7/2008 | Ottaviani | 482/55 |
| 2010/0288318 A1 | * | 11/2010 | Beaulieu | 135/29 |

FOREIGN PATENT DOCUMENTS

| | | | |
|---|---|---|---|
| CN | 2905612 | * | 5/2007 |
| KR | 20100033301 | * | 3/2010 |
| TW | 201041775 | * | 12/2010 |

* cited by examiner

Primary Examiner — Emma K Frick
(74) Attorney, Agent, or Firm — The Farrell Law Firm, P.C.

(57) ABSTRACT

A wind resistance apparatus removably attachable to a bicycle is provided. The apparatus includes a disc oriented to provide wind resistance as the bicycle moves; and a connecting piece coupled to the disc at one end of the connecting piece and including a mounting portion at another end of the connecting piece arranged to mount the connecting piece onto a the bicycle in an orientation where a periphery of the disc is substantially included within a plane that is substantially perpendicular to a plane passing through a rear wheel of the bicycle.

23 Claims, 12 Drawing Sheets

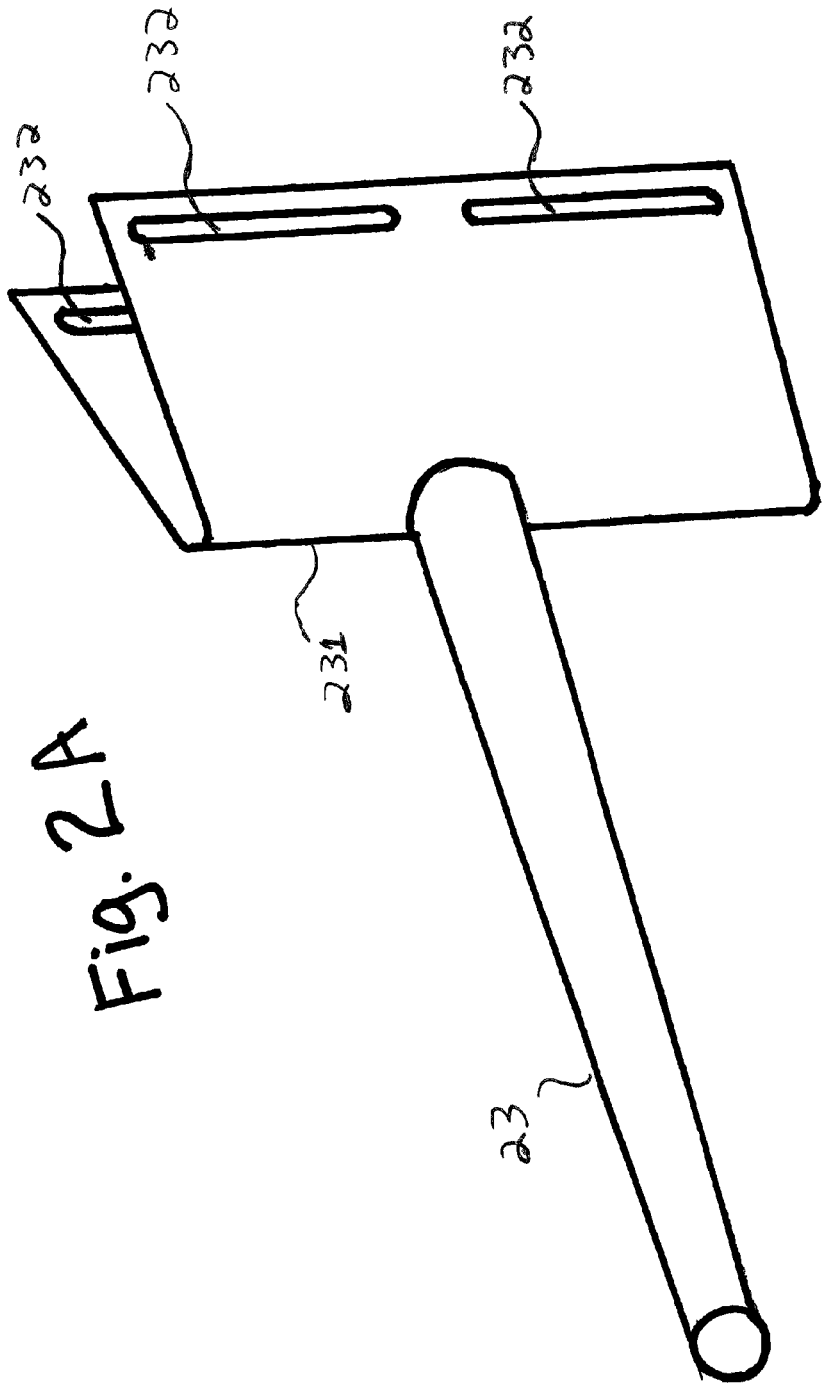

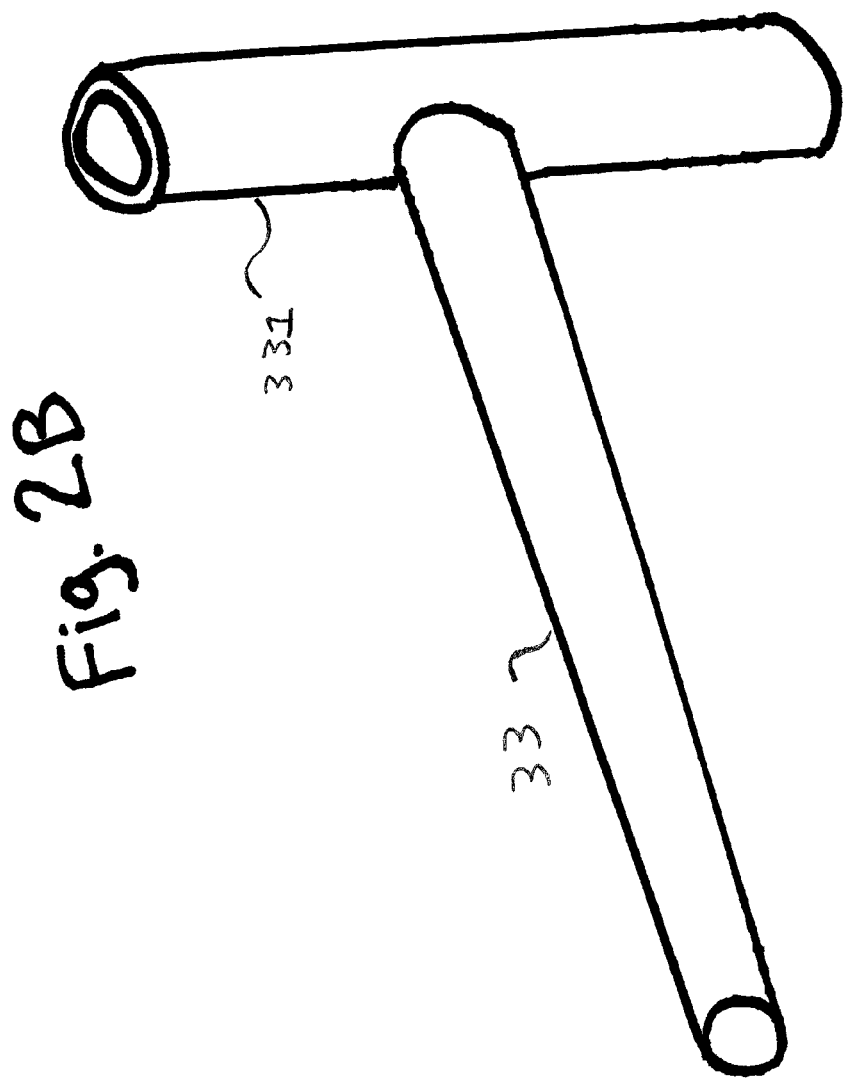

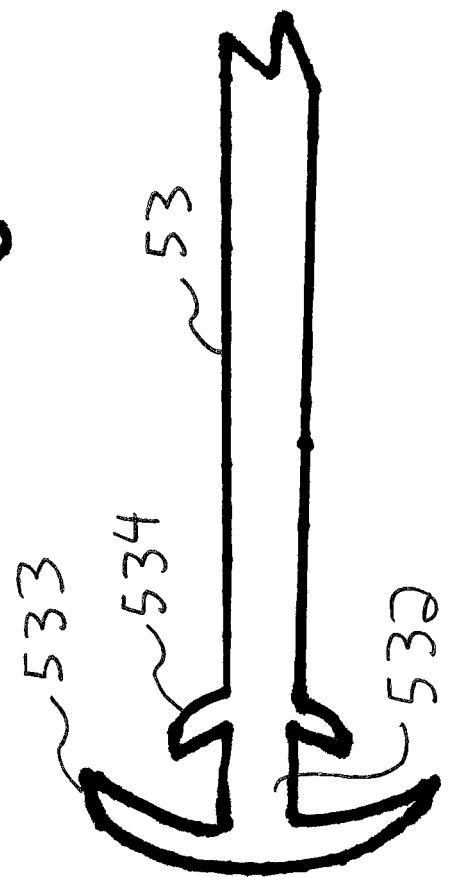

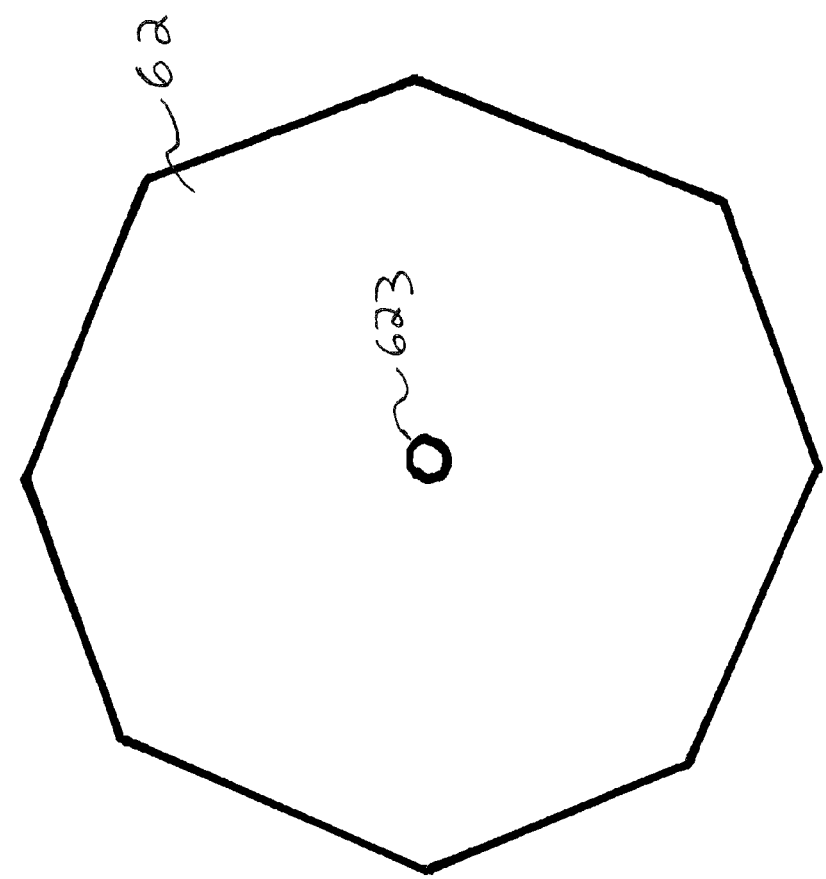

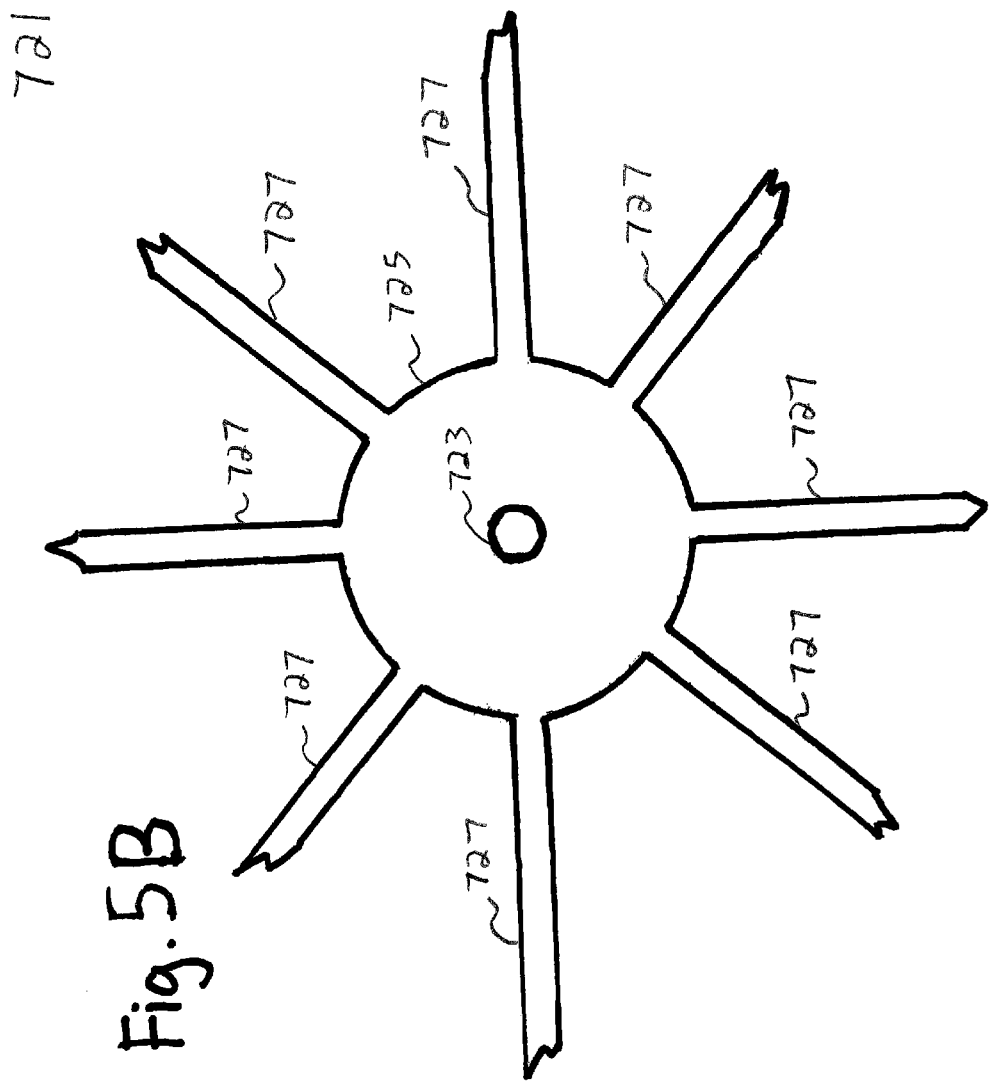

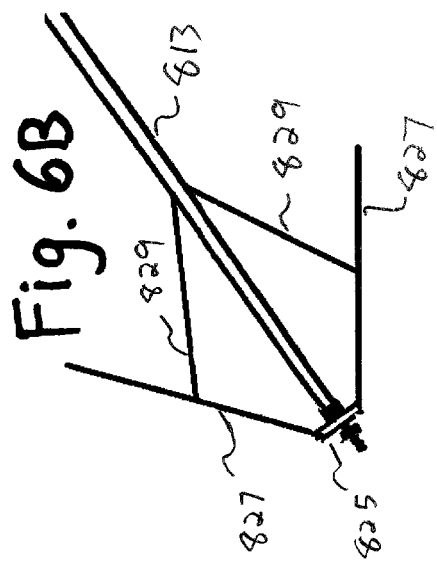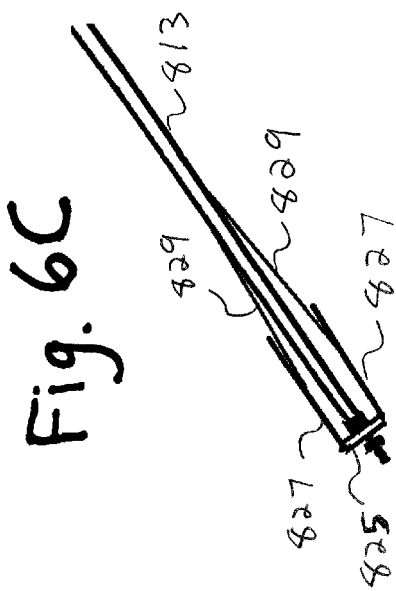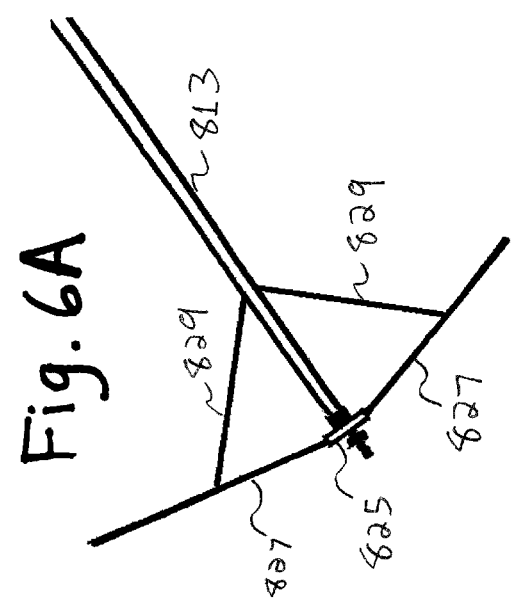

BICYCLE WIND RESISTANCE TRAINER

PRIORITY

This application claims priority under 35 U.S.C. §119(a) to a United States Provisional Application filed in the United States Patent and Trademark Office on Apr. 23, 2013 and assigned Ser. No. 61/815,032, the entire content of which is incorporated herein by reference.

BACKGROUND

1. Field of the Invention

The present invention generally relates to an apparatus, and more particularly, to an apparatus removably attached to bicycle to create a wind resistance.

2. Description of the Related Art

In the sport of cycling, aerodynamics plays a very major aspect. Bicycle manufacturers continuously work to improve the aerodynamics of their products, including bicycle parts and accessories, as well as cyclists' riding clothes. They continue to tweak their products to eliminate every possible source of wind drag, in order to reduce the energy cyclists need to generate to keep up to achieve a desired speed. Since bicycles and corresponding equipment are designed to reduce resistance and increase efficiently, it is difficult to use the same bicycles and equipment to perform training intended to build strength and to perform under circumstances more challenging than what to expect on race day.

SUMMARY OF THE INVENTION

The present invention has been made to address at least the above problems and/or disadvantages and to provide at least the advantages described below. Accordingly, an aspect of the present invention provides an apparatus that creates wind resistance during an actual bicycle ride to make the ride more difficult for the rider/athlete and therefore, to amount to a heavier workout and more effective training for the athlete.

According to an aspect of the present invention, a wind resistance apparatus removably attachable to a bicycle is provided. The apparatus includes a disc oriented to provide wind resistance as the bicycle moves; and a connecting piece coupled to the disc at one end of the connecting piece and including a mounting portion at another end of the connecting piece arranged to mount the connecting piece onto a the bicycle in an orientation where a periphery of the disc is substantially included within a plane that is substantially perpendicular to a plane passing through a rear wheel of the bicycle.

BRIEF DESCRIPTION OF THE DRAWINGS

The above and other aspects, features, and advantages of the present invention will be more apparent from the following detailed description taken in conjunction with the accompanying drawings, in which:

FIG. 2A is a diagram illustrating an angled side view of one end of a connecting piece at which the connecting piece is mounted onto a bicycle according to an embodiment of the present invention;

FIG. 2B is a diagram illustrating an angled side view of one end of a connecting piece at which the connecting piece is mounted onto a bicycle according to another embodiment of the present invention;

FIG. 3B is a diagram illustrating a side view of one end of a connecting piece at which the connecting piece is coupled to a disc according to another embodiment of the present invention;

FIG. 4 is a diagram illustrating a front view of a hard disc according to an embodiment of the present invention;

FIG. 5B a diagram illustrating a close-up view of a portion of a rigid frame of a disc according to an embodiment of the present invention;

FIGS. 6A-6C are diagrams illustrating a side cross-section of a rigid frame and a connecting piece according to an embodiment of the present invention;

DETAILED DESCRIPTION OF EMBODIMENTS OF THE PRESENT INVENTION

Figure 1:
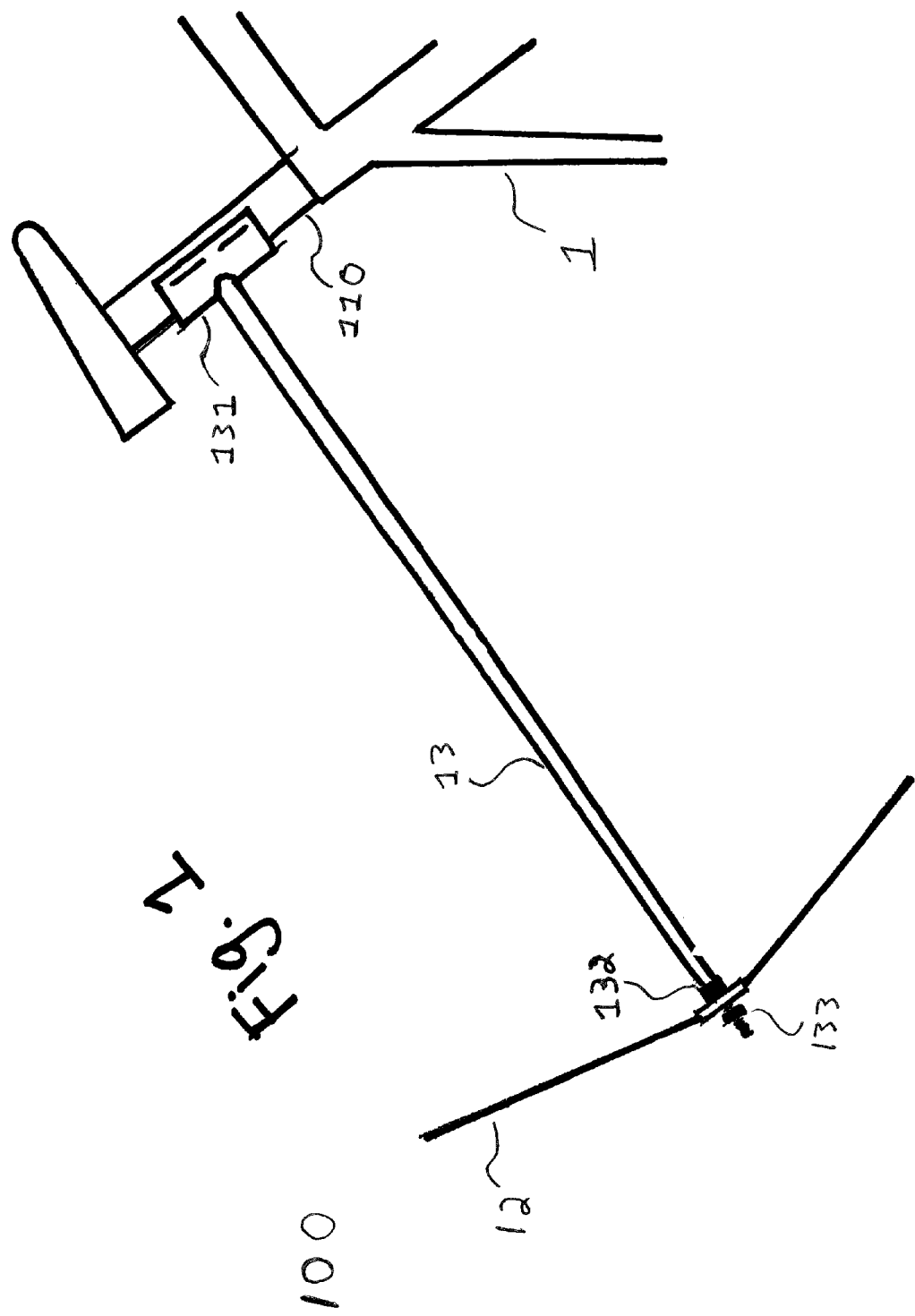
FIG. 1 is a diagram illustrating a side view of an apparatus removably attached to a bicycle according to an embodiment of the present invention.

Hereinafter, embodiments of the present invention will be described in detail with reference to the accompanying drawings. In the description herein, well-known functions and structures which may unnecessarily obscure the subject matter of the present invention may be omitted. The following description includes various specific details to assist in that understanding but these are to be regarded as mere examples. Accordingly, those of ordinary skill in the art will recognize that various changes and modifications of the various embodiments described herein can be made without departing from the scope and spirit of the present invention. Throughout the drawings, like reference numerals may be used to refer to like parts, components, and structures.

FIG. 1 is a diagram illustrating a side view of an apparatus removably attached to a bicycle according to an embodiment of the present invention.

Referring to FIG. 1, a rear portion of a bicycle 1 is illustrated, and an apparatus 100 is removably attached to a seat post 110 of the bicycle 1 and extends from the seat post 110 towards the rear of the bicycle 1. The apparatus 100 includes a disc 12 and a connecting piece 13. The disc 12 is used to create a wind resistance as the bicycle 1 moves. The connecting piece 13 is coupled to the disc 12 and mounted onto the seat post 110. Although the apparatus 100 shown in FIG. 1 extends from the seat post 110 in a rearward facing direction, the apparatus 100 can be attached to various portions of the bicycle 1 in various directions in accordance with embodiments of the present invention. Herein, mounting onto the bicycle 1 includes mounting directly onto parts of the bicycle 1 itself, such as a frame, seat post, etc., as well as mounting onto other equipment mounted onto the bicycle 1.

The connecting piece 13 has an end 131 at which the connecting piece 13 is mounted onto the seat post 110, and the other end 132 of the connecting piece 13 is coupled to the disc 12.

The connecting piece 13 distances the disc 12 from a rider of the bicycle 1 so that the disc 12 and the connecting piece 13 do not interfere with movement and vision of the rider. The disc 12 is secured to the connecting piece 13 by a holding piece 133, such as a retaining bolt, a nut, or a wing nut, screwed onto a threaded portion of the connecting piece 13. Although retaining bolt, a nut, and a wing nut are described here as examples, other removable holding pieces may be used to fasten the disc 12 to the connecting piece 13 in accordance with embodiments of the present invention.

According to alternative embodiments of the present invention, other types of fasteners may be used and/or the disc 12 may be directly secured to the connecting piece 13, such as by screwing the disc 12 directly onto a threaded portion of the connecting piece 13. The connecting piece 13 can be a rod formed of a rigid and/or flexible material. The rod may include several segmented rods connected to each other. The rod may be straight or curved, the segments of the rod may include straight and/or curved segments.

FIG. 2A is a diagram illustrating an angled side view of one end of a connecting piece at which the connecting piece is mounted onto the bicycle 1 according to an embodiment of the present invention.

Referring to FIGS. 1 and 2A, an end 231 of a connecting piece 23 to be mounted to a frame of the bicycle 1 (not shown in FIG. 2A) is in a V-shape. There are long holes 232 on the upper edge of the V-shape piece. Straps (not shown) may pass through holes 232 and tie onto a seat post or other portion of the bicycle 1. According to alternative embodiments of the present invention, hooks, clasps, clinches, rivets, clamps, ties, tethers, bolts, or other similar device may be used for mounting the connecting piece 23 onto a seat post or other portions of the bicycle 1.

FIG. 2B is a diagram illustrating an angled side view of one end of a connecting piece at which the connecting piece is mounted onto a bicycle according to another embodiment of the present invention.

Referring to FIGS. 1 and 2B, an end of the connecting piece 33 to be mounted onto the bicycle 1 (not shown in FIG. 2B) may be formed as a hollow cylinder 331. According to an embodiment of the present invention, the hollow cylinder 331 may be installed by removing a seat from the bicycle 1, and sliding the hollow cylinder 331 over a seat post, before adding the seat back onto the bicycle. The hollow diameter and the height of the hollow cylinder may be adjustable so that the hollow cylinder 331 matches with the seat post of the bicycle 1 without moving or sliding. For example, according to an embodiment of the present invention (not shown), the hollow cylinder 331 may be formed from a flexible material split at one side in order for the hollow cylinder 331 to conform to a variety of dimensions of a seat post. In this manner, the hollow cylinder 331 may be firmly secured to the bicycle 1 with or without other connecting pieces. Although a hollow cylinder 331 is described as an example, the end of the connecting piece to be mounted onto the bicycle 1 may be in the form of other shapes, including shapes based on a location of the frame of the bicycle 1 to which the connecting piece is to be mounted and/or the size/shape of the frame of the bicycle 1.

Figure 3A:
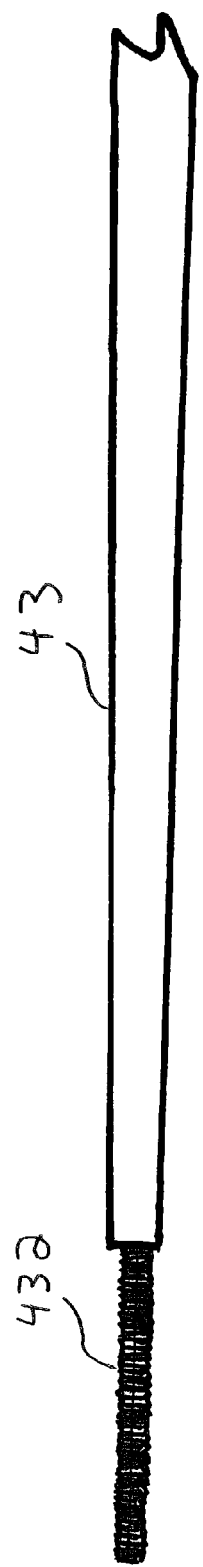
FIG. 3A is a diagram illustrating a side view of one end of a connecting piece at which the connecting piece is coupled to a disc according to an embodiment of the present invention.

FIG. 3A is a diagram illustrating a side view of one end of a connecting piece at which the connecting piece is coupled to a disc according to an embodiment of the present invention.

Referring to FIGS. 1 and 3A, an end of a connecting piece 43 includes metal threads 432 onto which a holding piece, such as the holding piece 133 of FIG. 1 (not shown in FIG. 3A) may be screwed. A disc (not shown in FIG. 3A), such as the disc 12 of FIG. 1, can be firmly held between the connecting piece 43 by the holding piece. In this manner, the connecting piece 43 is removably coupled to the disc 12.

FIG. 3B is a diagram illustrating a side view of an end of a connecting piece at which the connecting piece is coupled to a disc according to another embodiment of the present invention.

Referring to FIG. 3B, an end 532 of a connecting piece 53 includes two holding pieces 533 and 534. A disc (not shown), such as the disc 12 of FIG. 1, is installed by moving the disc 12 along the connecting piece 53 and past the holding piece 534 so that the disc 12 is held between two holding pieces 533 and 534. In this manner, the connecting piece 53 is coupled to the disc 12.

Although, in the above-described embodiments, the connecting piece is separate with the disc, a connecting piece may be integrated with disc as one piece, in accordance with embodiments of the present invention.

Figure 5A:
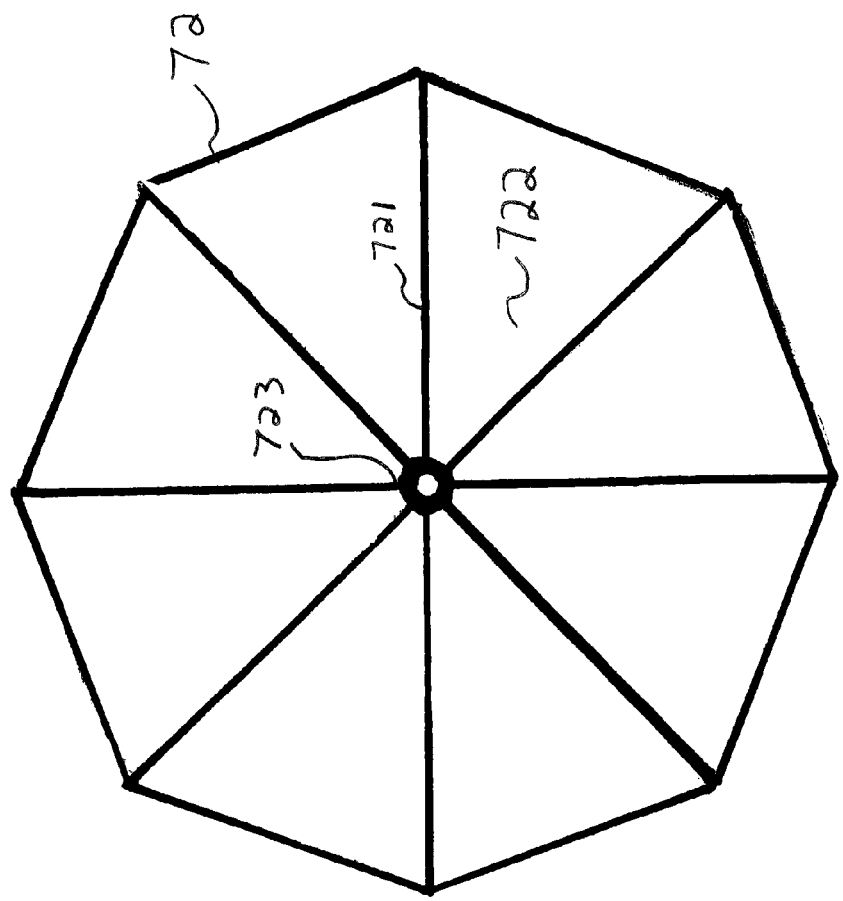
FIG. 5A is a diagram illustrating a front view of a soft disc according to an embodiment of the present invention.

FIGS. 4, 5A, and 5B are diagrams illustrating discs according to various embodiments of the present invention.

FIG. 4 is a diagram illustrating a front view of a hard disc according to an embodiment of the present invention.

Referring to FIGS. 1 and 4, the disc 12 of FIG. 1 may be in the form of a hard disc 62 in FIG. 4. The hard disc 62 can be made of any of various rigid materials, such as metal, plastic, wood, or any combination thereof. The hard disc 62 includes hole 623 in the center of thereof, where a connecting piece, such as any of the connecting pieces of FIGS. 1, 3A, and 3B, enters and is coupled to the hard disc 62. Although the perimeter of the hard disc 62 illustrated in FIG. 4 is an octagon, discs of various other shapes, such as a circle, an ellipse, a polygon, etc., may be used in accordance with embodiments of the present invention. The size of various aspects of disc, such as a diameter, a perimeter, an area, a volume, or the like, can be vary from that of the hard disc 62 in accordance with embodiments of the present invention. For example, a diameter of a disc may be comparable with a diameter of a wheel (not shown) of the bicycle 1, in accordance with an embodiment of the present invention.

As shown in FIGS. 1 and 4, when the disc 12 of FIG. 1 is in the form of disc 62 of FIG. 4, the wind resistance apparatus is mountable onto the bicycle 1 (not shown in FIG. 4) in an orientation shown in FIG. 1, in which a plane that includes a periphery of the disc 62, as defined by the perimeter of the disc 62 in FIG. 4, is substantially perpendicular to the bicycle 1.

Herein, "perpendicular to the bicycle" refers to an orientation perpendicular to a plane substantially passing through a main body of the bicycle 1, such as a plane passing through a rear wheel (not shown) of the bicycle 1, for example. Herein, a plane substantially passing through a periphery of a disc refers to a plane such as that described with respect to FIG. 4. Although discs may have various shapes that may vary the absolute periphery of a disc in accordance with embodiments of the present invention, such as loose or movably flaps extending beyond the boundary depicted in FIG. 4, the plane extending through the periphery of the disc refers to a plane substantially passing through a main body of the disc with respect to an orientation required to provide wind resistance when the bicycle 1 is moving.

According to alternative embodiments of the present invention, the disc 12 of FIG. 1 may rotate with respect to the connecting piece 13 and the connecting piece may rotate with respect to the bicycle 1 (such as rotation near the end 131 at which the connecting piece 13 is mounted onto the seat post 110), within or outside of a plane perpendicular to the bike. The wind resistance apparatus may be locked into various positions through rotation at these locations in order to vary wind resistance, or for storage.

FIG. 5A is a diagram illustrating a front view of a soft disc according to an embodiment of the present invention. FIG. 5B is a diagram illustrating a close up of a rigid frame according to an embodiment of the present invention.

Referring to FIGS. 1 and 5A, the disc 12 of FIG. 1 may be in the form of a soft disc 72, such as in FIG. 5A. The soft disc 72 includes a rigid frame 721 with multiple arms emanating from the center of a central portion 725 of the rigid frame 721, and a flexible material 722 secured to the arms of the rigid frame 721. The rigid frame 721 can be made of metal, plastic, wood, or the combination. The hole 723 in the center of the soft disc 72 is where the connecting piece 13 enters and can be coupled to the soft disc 72 by itself or by a removable holding piece. The periphery of the rigid frame 721 forms a shape of the soft disc 72, that can be varied including a two-dimensional shape, such as a circle, an ellipse, a polygon, or the like, with a relatively thin thickness. The size of the soft disc 72, such as a diameter, a perimeter, an area, a volume, or the like, can be varied based on the shape of the soft disc 72, that is, the periphery of the rigid frame 721. For example, if the periphery of the rigid frame 721 forms a circle, the diameter of soft disc 72 may be adjusted to be comparable with that of a wheel (not shown) of the bicycle 1.

FIG. 5B is a diagram illustrating a close-up view of a portion of a rigid frame of a disc according to an embodiment of the present invention.

As shown in FIG. 5B, the rigid frame 721 includes a central portion 725 and a plurality of arms 727. The plurality of arms 727 and the central portion 725 may be formed as a single piece, or the arms 727 may be formed as separate pieces permanently or removably attached to the central portion 725. The arms 727 may be fixed relative to the central portion 725, or may be rotatable with respect to the central portion 725 at or near an end of each of the arms 727 connected to the central portion 725.

Referring to FIG. 5B, the multiple arms may also be connected to the center of the disc with a pivot/hinge and movable. A sliding shaft is included for each arm of the rigid frame. Each sliding shaft has one end (outer end) permanently attached with a pivot to a chosen point of its corresponding arm, and a second end (inner or sliding end) attached to the connecting piece (attached to the bike) in a sliding manner with a lock. All sliding shafts are designed to slide simultaneously, either away from or towards the center of the disc.

If all sliding shafts are slide simultaneously away from the bike, it refers to an open disc position. As the user slides the shafts towards the bike, all the arms come closer to the connecting piece and correspondingly cause the rigid frame to close, which refers to a closed disc position.

If all sliding shafts are slide simultaneously towards the bike, it refers to a closed disc position. As the user slides the shafts away from the bike, all the arms to go farther from the connecting piece and correspondingly cause the rigid frame to open, which refers to an open disc position.

The more parallel the shafts are to the connecting piece, the smaller the disc size is. In other words, the more perpendicular the shafts are to the connecting piece, the bigger the disc size is.

At any point in the range of the movement of the sliding shafts, the sliding shaft can be locked. This allows the user to choose the size of disc depending on the position of the sliding shafts when the pivot/hinge is locked, based on how much wind resistance or drag the user wants for the ride.

Figure 5C:
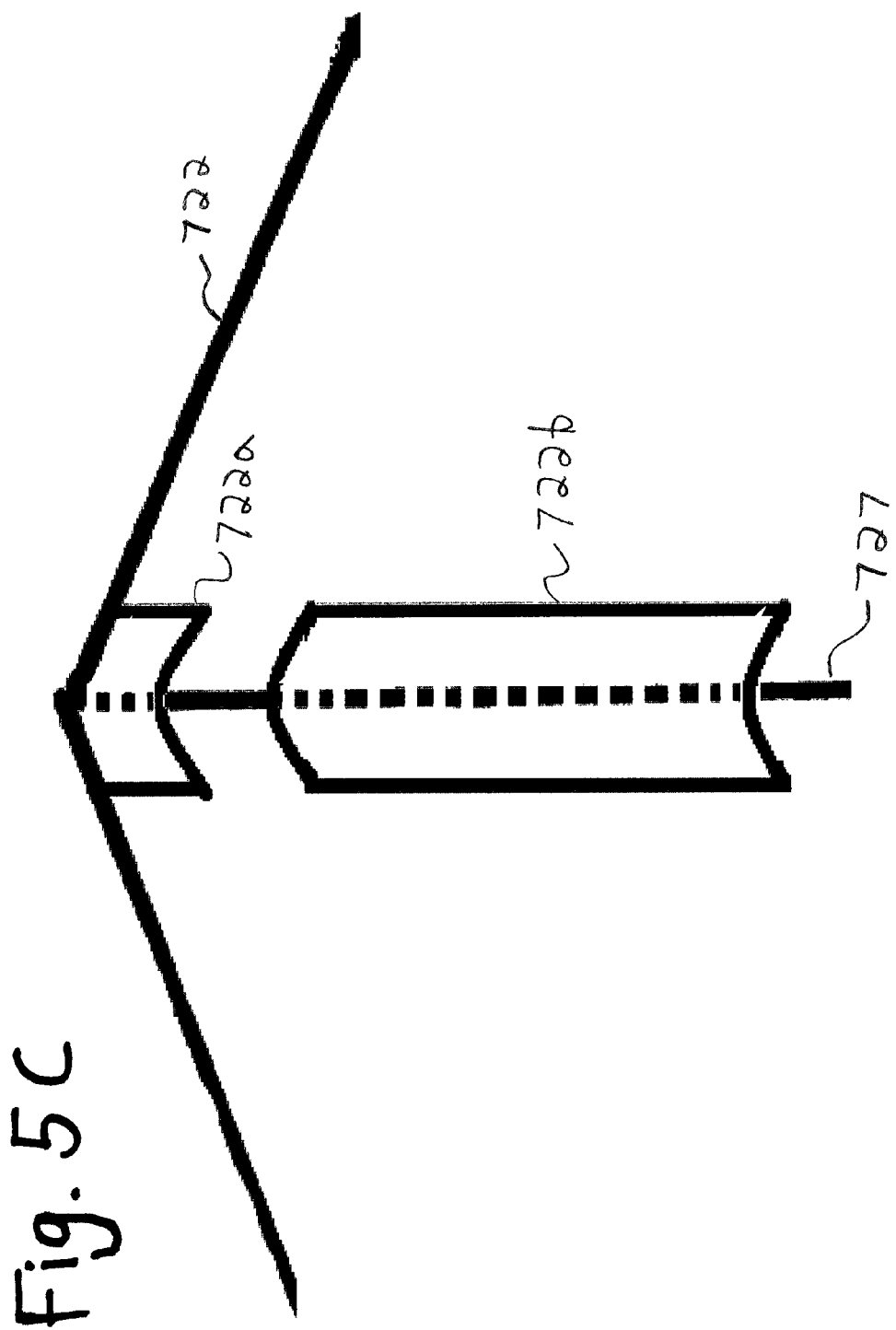
FIG. 5C is a diagram illustrating a close up view of a portion of a perimeter of a soft disc according to an embodiment of the present invention.

FIG. 5C is a diagram illustrating a close-up view of a portion of a flexible disc according to an embodiment of the present invention.

Referring to FIGS. 5A through 5C, the flexible material 722 may be permanently or removably affixed to the rigid frame. For example, each of the arms 727 of the rigid frame 721 may pass through one or more loops 722b included in the flexible material 722b, and an end of each arm 727 may be inserted into a pocket 722a included at a perimeter of the flexible material 722. Although the loop 722b and pocket 722a are provided as examples, the flexible material 722 may be permanently or removable affixed to the rigid frame in other ways, such as through ties, clasps, adhesives, hook-and-loop fasteners, etc.

FIGS. 6A-6C are diagrams illustrating a side cross-section of a rigid frame and a connecting piece according to an embodiment of the present invention.

FIGS. 6A-6C illustrate an embodiment in which a flexible material (not shown) may be permanently or removably affixed to a rigid frame including arms 827 rotatably connected to a central portion 825 of the rigid frame at various positions including an opened position depicted in FIG. 6A, an intermediate position depicted in FIG. 6B, and a closed position depicted in FIG. 6C. According to different embodiments of the present invention, the open, intermediate, and closed positions may occur at different angles than that depicted in FIGS. 6A-6C in accordance with embodiments of the present invention. Further, there may be a plurality of fixed intermediate positions at predetermined angles, or the arms 827 may be fixed at any angle between the open and closed positions in accordance with embodiments of the present invention.

The arms 827 are also each connected to the connected piece 813 by a corresponding sliding shaft 829, while an opposite end of each sliding shaft 829 is connected to the connecting piece 813. When the arms 827 rotate from the open position in FIG. 6A through the intermediate position in FIG. 6B to the closed position in FIG. 6C, the sliding shafts 829 rotate with respect to the arms 827, while rotating and moving horizontally with respect to the connecting piece 813.

The ends of the sliding shafts 829 that slide with respect to the connecting piece 813 may be linked to each other, in order to enable the sliding shafts 829 to move in unison while opening/closing the arms 827.

When the arms 827 are arranged in the intermediate position of FIG. 6B a flexible material (not shown) attached to the arms 827 provides more wind resistance than when the arms 827 are arranged in the closed position of FIG. 6C, but less wind resistance than when the arms 827 are arranged in the opened position of FIG. 6A. Therefore, the arms 827 may be adjusted and locked in various positions in order to vary the amount of wind resistance provided by the flexible material attached to the arms 827.

Although FIGS. 6A-6C illustrate an example of arms to be attached to a flexible material of a disc and sliding shafts to facilitate opening and closing of the arms and locking the arms in various positions, other mechanisms for opening/closing the flexible material in order to vary the wind resistance may be used in accordance with embodiments of the present invention.

Figure 7:
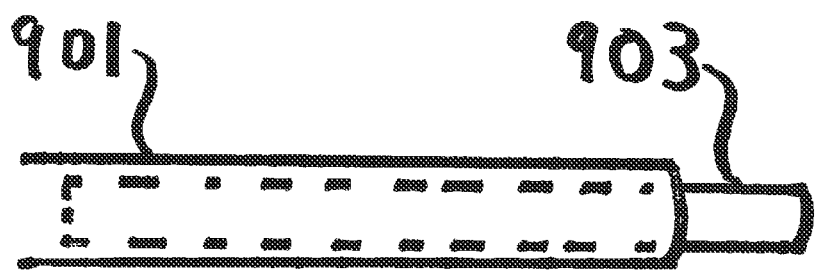
FIG. 7 is a diagram illustrating telescoping segments according to an embodiment of the present invention.

FIG. 7 is a diagram illustrating telescoping segments according to an embodiment of the present invention.

Referring to FIG. 7, according to alternative embodiments of the present invention, any or all of the arms of the rigid frame and the connecting piece may be formed of multiple sliding segments, such as through telescoping rods, for example, in order to vary the length of the arms and or the connecting piece and may be locked at various lengths. For example, a connecting piece or an arm of a rigid frame according to an embodiment of the present invention may include telescoping segments 901 and 903.

Figure 8A:
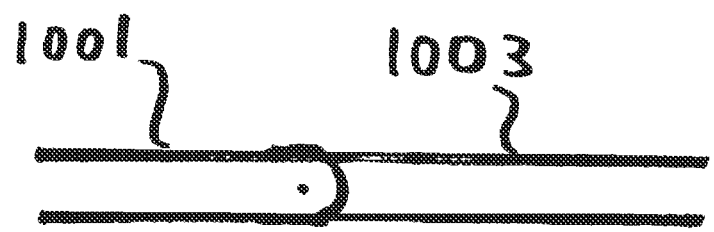
FIGS. 8A and 8B are diagrams illustrating rotating segments according to an embodiment of the present invention.
Figure 8B:
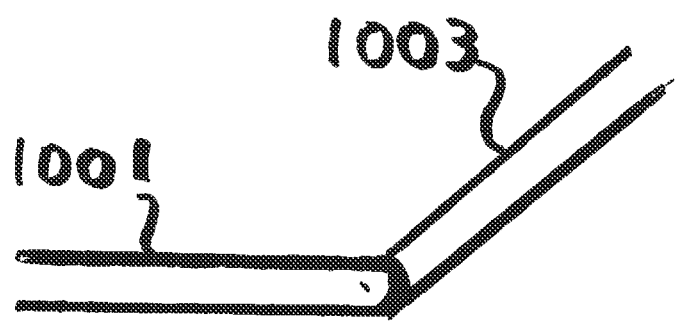

FIGS. 8A and 8B are diagrams illustrating rotating segments according to an embodiment of the present invention.

Referring to FIGS. 8A and 8B, according to alternative embodiments of the present invention, the disc may be rotatably attached to the connecting piece so that the disc may be rotated from a position perpendicular to the connecting piece to a position parallel to the connecting piece or any intermediate position. Similarly, the connecting piece may also be rotatable with respect to a location at which the connecting piece mounts onto a bicycle and/or at any position along the length of the connecting piece. For example, a connecting piece of a rigid frame according to an embodiment of the present invention may include rotating segments 1001 and 1003 shown in a straightened form in FIG. 8A and in a rotated form as shown in FIG. 8B.

These adjustments in length and rotatable attachments may be used to increase/reduce the size and/or alter the shape of the wind resistance apparatus for use/storage, positioning of the disc relative to the bike, and/or to further vary the amount of wind resistance provided by the disc.

As shown above, embodiments of the present invention allow a cyclist to use a bicycle and corresponding equipment, which may be designed to reduce wind resistance and maximize efficiency, with in conjunction with a device that provides wind resistance, so that the cyclist may use the same equipment for both competition and resistance training, allowing a cyclist to maintain consistency with the equipment used. Further, a cyclist may vary the amount of resistance by mounting/dismounting the wind resistance apparatus, replacing a disc of the wind resistance apparatus with a disc with different wind resistance properties (e.g., size, shape, etc.), or by adjusting a flexible material of the disc through various positions to increase/decrease wind resistance. Therefore, a cyclist is able to conveniently attain a desired level of wind resistance.

For transporting the bicycle with a wind resistance apparatus according to an embodiment of the present invention, the attached disc may be removed from the connecting piece to minimize the size of the bike, or for safety reasons, such as when the bicycle is mounted on a car roof rack.

While the present invention has been particularly shown and described with reference to certain embodiments thereof, various changes in form and detail may be made therein without departing from the spirit and scope of the present invention as defined by the following claims. Accordingly, the scope of the present invention will be defined by the appended claims and equivalents thereto.

What is claimed is:

1. A wind resistance apparatus removably attachable to a bicycle, the apparatus comprising:
a disc oriented to provide wind resistance via wind contacting a surface of the disc as the bicycle moves; and
a connecting piece coupled to the disc at one end of the connecting piece and including a mounting portion at another end of the connecting piece arranged to mount the connecting piece onto a seat post of the bicycle in an orientation where a periphery of the disc is substantially included within a plane that is substantially perpendicular to a plane passing through a rear wheel of the bicycle and substantially perpendicular to a ground plane corresponding to a surface upon which a front wheel and the rear wheel are supported,
wherein the connecting piece includes a straight rod comprising at least one rigid rod segment extending in a rearward direction with respect to the bicycle, from the mounting portion at a fixed angle, to the disc arranged in a direction substantially parallel to the ground plane while the mounting portion is mounted on to the bicycle.

2. The apparatus of claim 1, wherein the connecting piece is arranged to mount onto the frame of the bicycle using at least one of a hook, a clasp, a clinch, a rivet, a clamp, a tie, and a tether.

3. The apparatus of claim 1, wherein the connecting piece is removably coupled to the disc.

4. The apparatus of claim 1, wherein the connecting piece is coupled to the disc such that an end of the connecting piece is inserted through a hole in the disc.

5. The apparatus of claim 4, wherein the end of the connecting piece inserted through the hole in the disc includes a threaded portion.

6. The apparatus of claim 5, wherein the disc is coupled to the connecting piece by screwing the disc onto the threaded portion of the connecting piece.

7. The apparatus of claim 4, further comprising a holding piece coupled to the end of the connecting piece that is inserted through the hole in the disc to couple the disc to the connecting piece.

8. The apparatus of claim 7, wherein the end of the connecting piece inserted through the hole in the disc includes a threaded portion.

9. The apparatus of claim 8, wherein the holding piece includes at least one of a retaining bolt and a wing nut and the holding piece is screwed onto the threaded portion of the connecting piece to couple the disc to the connecting piece.

10. The apparatus of claim 1, wherein the disc includes a rigid material.

11. The apparatus of claim 10, wherein the disc is a hard disc formed of the rigid material.

12. The apparatus of claim 1, wherein the disc includes a flexible material.

13. The apparatus of claim 12, wherein the disc comprises:
a rigid frame having a plurality arms extending from a central portion of the disc; and
the flexible material secured to the plurality of arms.

14. The apparatus of claim 13, wherein flexible material is removably secured to the plurality of arms.

15. The apparatus of claim 13, wherein the plurality arms are rotatably coupled to the central portion of the disc.

16. The apparatus of claim 15, wherein the plurality of arms are coupled to the central portion of the disc such that the plurality of arms are lockable at a plurality of different orientations with respect to the central portion of the disc.

17. The apparatus of claim 13, wherein the flexible material is non-removably secured to the plurality of arms.

18. The apparatus of claim 13, wherein each of the plurality of arms includes a plurality of arm segments that are at least one of rotatably and slidably coupled to each other.

19. The apparatus of claim 13, wherein the rigid frame is a non-movable frame, and the plurality of arms are rigid arms extending from a central portion of the disc to a periphery of the disc.

20. The apparatus of claim 1, wherein the at least one rigid rod segment includes a plurality of rigid rod segments that are at least one of rotatably and slidably coupled to each other.

21. The apparatus of claim 1, wherein a longitudinal axis of the rod is coaxial with a center of the disc.

22. A wind resistance apparatus removably attachable to a bicycle, the apparatus comprising:
- a disc oriented to provide wind resistance via wind contacting a surface of the disc as the bicycle moves; and
- a connecting piece coupled to the disc at one end of the connecting piece and including a mounting portion at another end of the connecting piece arranged to mount the connecting piece onto a seat post or a frame of the bicycle in an orientation where a periphery of the disc is substantially included within a plane that is substantially perpendicular to a plane passing through a rear wheel of the bicycle and substantially perpendicular to a ground plane corresponding to a surface upon which a front wheel and the rear wheel are supported,
- wherein the connecting piece includes a straight rigid rod extending in a rearward direction with respect to the bicycle, from the mounting portion at a fixed angle, to the disc arranged in a direction substantially parallel to the ground plane while the mounting portion is mounted on to the bicycle.

23. The apparatus of claim 22, wherein a longitudinal axis of the rod is coaxial with a center of the disc.

* * * * *